US009836137B2

(12) United States Patent
Lee (10) Patent No.: US 9,836,137 B2
(45) Date of Patent: Dec. 5, 2017

(54) ULTRASONIC WAVE RECEIVER AND POSITION INFORMATION INPUT APPARATUS COMPRISING SAME

(71) Applicant: PNF CO., LTD, Seongnam-si, Gyeonggi-do (KR)

(72) Inventor: Jae Jun Lee, Seoul (KR)

(73) Assignee: PNF CO., LTD, Seongnam-si, Gyeonggi-Do (KR)

( * ) Notice: Subject to any disclaimer, the term of this patent is extended or adjusted under 35 U.S.C. 154(b) by 67 days.

(21) Appl. No.: 14/893,624

(22) PCT Filed: May 27, 2014

(86) PCT No.: PCT/KR2014/004747
§ 371 (c)(1),
(2) Date: Nov. 24, 2015

(87) PCT Pub. No.: WO2014/193156
PCT Pub. Date: Dec. 4, 2014

(65) Prior Publication Data
US 2016/0103507 A1    Apr. 14, 2016

(30) Foreign Application Priority Data

May 27, 2013  (KR) .................. 10-2013-0059991

(51) Int. Cl.
*G06F 3/0354*    (2013.01)
*G01S 5/18*    (2006.01)
(Continued)

(52) U.S. Cl.
CPC ............ *G06F 3/03545* (2013.01); *G01S 5/18* (2013.01); *G06F 1/16* (2013.01); *G06F 3/0383* (2013.01); *G01S 3/8083* (2013.01); *G06F 1/1684* (2013.01)

(58) Field of Classification Search
CPC .... G06F 3/043; G06F 3/03545; G06F 3/0383; G06F 2200/1632; G06F 17/30041;
(Continued)

(56) References Cited

U.S. PATENT DOCUMENTS 5,483,262 A * 1/1996 Izutani .................. G06F 1/1626
178/19.01
5,973,677 A * 10/1999 Gibbons ............... G06F 1/1626
178/18.04
(Continued)

FOREIGN PATENT DOCUMENTS

KR    10-0418423    2/2004
KR    10-0544727    1/2006
(Continued)

OTHER PUBLICATIONS

Written Opinion with English Translation for International Application No. PCT/KR2014/004747, dated Oct. 27, 2014.
(Continued)

*Primary Examiner* — Dismery Mercedes
(74) *Attorney, Agent, or Firm* — Kile Park Reed & Houtteman PLLC (57) ABSTRACT

Disclosed are an ultrasonic wave receiver and a position information input apparatus comprising same. A signal generator and the ultrasonic wave receiver of the present invention both comprise a rechargeable battery therein whereby same are driven, and are coupled to a main body part when position information input is finished. The main body part comprises a large-capacity battery supplied and charged with a charging current from an external electronic device. Also, the main body part charges the signal generator and the ultrasonic wave receiver by supplying same with a charging current from the large-capacity battery when the signal generator and the ultrasonic wave receiver are coupled to the main body part. Accordingly, the position (Continued)

information input apparatus can easily be carried by coupling the signal generator and the ultrasonic wave receiver to main body part, and can maintain the signal generator and the ultrasonic wave receiver in charged state.

14 Claims, 6 Drawing Sheets

(51) Int. Cl.
    *G06F 3/038*     (2013.01)
    *G06F 1/16*     (2006.01)
    *G01S 3/808*     (2006.01)

(58) Field of Classification Search
    CPC ........ G06F 1/16; G06F 1/1632; G06F 1/1694; G01S 7/52023; G01S 7/526; G01S 3/8083; G01S 5/18; G01S 5/22
    See application file for complete search history.

(56) References Cited

U.S. PATENT DOCUMENTS

| | | | |
|---|---|---|---|
| 6,124,847 A * | 9/2000 | Chery | G06F 3/03545 178/18.04 |
| 7,268,774 B2 * | 9/2007 | Pittel | G06F 1/3203 178/18.01 |
| 7,336,262 B2 * | 2/2008 | Tsuji | G06F 3/03545 345/173 |
| 7,541,907 B2 * | 6/2009 | Wang | G06F 1/1632 335/214 |
| 7,643,016 B2 * | 1/2010 | Ake | G06F 3/03545 178/18.01 |
| 9,274,623 B2 * | 3/2016 | Lee | G06F 3/041 |
| 9,280,215 B2 * | 3/2016 | Lee | G06F 3/03545 |
| 2004/0160429 A1 * | 8/2004 | Blake | G06F 3/03545 345/179 |
| 2004/0201580 A1 * | 10/2004 | Fujiwara | G06F 3/03545 345/179 |
| 2006/0290682 A1 * | 12/2006 | Ake | G06F 3/0433 345/173 |
| 2010/0021022 A1 * | 1/2010 | Pittel | G06F 3/03545 382/123 |
| 2011/0018844 A1 * | 1/2011 | Ko | G06F 3/03545 345/179 |
| 2011/0141067 A1 * | 6/2011 | Misawa | G06F 3/0304 345/179 |
| 2011/0310065 A1 * | 12/2011 | Liang | G06F 1/1626 345/179 |
| 2013/0163187 A1 * | 6/2013 | Wang | G06F 1/1632 361/679.41 |
| 2013/0328836 A1 * | 12/2013 | Lee | G06F 3/0383 345/177 |

FOREIGN PATENT DOCUMENTS

| | | |
|---|---|---|
| KR | 10-0972229 | 7/2010 |
| KR | 10-2010-0089204 | 8/2010 |
| KR | 10-2012-0093708 | 8/2012 |

OTHER PUBLICATIONS

International Search Report for International Application No. PCT/KR2014/004747, dated Oct. 27, 2014.

* cited by examiner

ULTRASONIC WAVE RECEIVER AND POSITION INFORMATION INPUT APPARATUS COMPRISING SAME

TECHNICAL FIELD

The present invention relates to a position information input apparatus, and more particularly, to an ultrasonic wave receiver and a position information input apparatus comprising the same.

BACKGROUND ART

Recently, various types of electronic devices including a mouse are being presented on the market as a position information input apparatus. An example of the electronic devices is an information input apparatus using ultrasonic waves. The position information input apparatus using ultrasonic waves serves to input position information, by measuring a position of a pen-shaped signal generating device, based on distances between the signal generating device and ultrasonic signal receiving sensors, and a distance between the ultrasonic signal receiving sensors. In this case, the distances are obtained by using differences between a time when a reference signal (e.g., infrared ray, RF signal, etc.) has been received, and times when ultrasonic signals have been received by the ultrasonic signal receiving sensors spaced from each other by a predetermined distance, respectively. The ultrasonic signals which propagate at a speed of sound, and the reference signal which propagates at a speed of light are simultaneously generated from the signal generating device. An example of such position information input apparatus has been disclosed in Korean Patent Publication No. 0418423.

The conventional position information input apparatus using an ultrasonic wave signal is composed of a signal generator and an ultrasonic wave receiver. For a user's free input of position information, both of the signal generator and the ultrasonic wave receiver should be implemented as wireless devices.

However, all signal generators and ultrasonic wave receivers being currently presented out on the market, have commercial batteries (e.g., AA size or mercury cells, etc.) therein. If the battery is used up, a new battery is purchased for replacement. However, since a user cannot precisely predict the lifespan of the battery, an operation of the product may be stopped due to exhaustion of the battery.

Further, since the signal generator and the ultrasonic wave receiver are manufactured as separate products, a user should carry them separately. This may cause a user's inconvenience, resulting in lowering a utilization degree of the product.

DISCLOSURE OF THE INVENTION

Therefore, an object of the present invention is to provide a position information input apparatus capable of enhancing a user's portability by coupling a signal generator and an ultrasonic wave receiver which constitute the position information input apparatus to each other.

Another object of the present invention is to provide an ultrasonic wave receiver capable of preventing stop of an operation due to exhaustion of a battery while being carried, by being automatically charged with a signal generator which constitutes a position information input apparatus, and the information input apparatus having the same.

To achieve these and other advantages and in accordance with the purpose of the present invention, as embodied and broadly described herein, there is provided an ultrasonic wave receiver, including: an ultrasonic wave receiving unit including a plurality of ultrasonic wave sensors spaced from each other by a preset distance and configured to receive ultrasonic wave signals generated from a signal generator; an ultrasonic wave receiver housing having the ultrasonic wave receiving unit therein, and having a first magnetic member installed on a lower surface thereof; and a fixing member hinge-coupled to a lower part of the ultrasonic wave receiver housing, and having a second magnetic member installed at a position corresponding to the first magnetic member, wherein the first and second magnetic members are coupled to each other by a magnetic attraction, thereby fixing a writing member on which writing is performed between the ultrasonic wave receiver housing and the fixing member.

In an embodiment of the present invention, the ultrasonic wave receiver may further include: a distance measuring unit configured to measure distances between the signal generator and the ultrasonic wave sensors, based on the ultrasonic wave signals received from the ultrasonic wave receiving unit; and a communication unit configured to transmit the distances measured by the distance measuring unit.

In an embodiment of the present invention, the ultrasonic wave receiver may further include: a position measuring unit configured to measure a position of the signal generator, based on the ultrasonic wave signals received from the ultrasonic wave receiving unit; and a communication unit configured to transmit information on the position of the signal generator measured by the position measuring unit.

In an embodiment of the present invention, the ultrasonic wave receiver may further include a battery chargeable by an external charging current, and configured to supply power to the ultrasonic wave receiver.

To achieve these and other advantages and in accordance with the purpose of the present invention, as embodied and broadly described herein, there is also provided a position information input apparatus, including: the ultrasonic wave receiver of one of claims 1 to 4; and a main body part including a body housing coupled to the ultrasonic wave receiver.

In an embodiment of the present invention, an ultrasonic wave receiver contact electrode for receiving a charging current may be formed on one surface of the ultrasonic wave receiver housing, the one surface contacting the body housing. And an ultrasonic wave receiver charging terminal for supplying a charging current to the ultrasonic wave receiver by contacting the ultrasonic wave receiver contact terminal, may protrude from the body housing at a position corresponding to the ultrasonic wave receiver contact terminal.

In an embodiment of the present invention, a pair of guide grooves may be formed on an outer surface of the ultrasonic wave receiver housing, and a first accommodation portion configured to accommodate the ultrasonic wave receiver therein may be formed at the body housing. And a pair of guide rails for guiding and fixing the ultrasonic wave receiver housing into the first accommodation portion, by being coupled with the pair of guide grooves, may be formed on an inner surface of the first accommodation portion.

In an embodiment of the present invention, the ultrasonic wave receiver housing and the body housing may be coupled to each other to be fixed by a magnetic attraction.

In an embodiment of the present invention, the first accommodation portion for accommodating the ultrasonic wave receiver may be formed at the body housing, and a third magnetic member may be formed on one surface of the ultrasonic wave receiver housing, the one surface contacting the first accommodation portion. A fourth magnetic member may be installed at the first accommodation portion at a position corresponding to the third magnetic member. As the third and fourth magnetic members are coupled to each other by a magnetic attraction, the ultrasonic wave receiver housing may be fixed in an accommodated state in the first accommodation portion.

In an embodiment of the present invention, the position information input apparatus may further include the signal generator coupled to the main body part. The signal generator may include: an ultrasonic wave generating unit configured to generate an ultrasonic wave signal; a battery chargeable by an external charging current, and configured to supply power to the signal generator; and a signal generator housing configured to accommodate therein the ultrasonic wave generating unit and the battery. The battery may be charged as the signal generator is coupled to the main body part to receive a charging current from the main body part.

In an embodiment of the present invention, a signal generator contact electrode for receiving a charging current may be formed on one surface of the signal generator housing, the one surface contacting the body housing. A mounting unit for mounting the signal generator may be formed at the body housing. And a signal generator charging terminal for supplying a charging current to the signal generator by contacting the signal generator contact electrode may protrude from the mounting unit, at a position corresponding to the signal generator contact electrode.

In an embodiment of the present invention, the main body part may further include a cover portion for covering the body housing and the signal generator, in order to fix the signal generator mounted to the mounting unit.

In an embodiment of the present invention, a signal generator contact electrode for receiving a charging current may be formed on one surface of the signal generator housing, the one surface contacting the body housing. A second accommodation portion for accommodating the signal generator therein may be formed at the body housing. And a signal generator charging terminal for supplying a charging current to the signal generator by contacting the signal generator contact electrode may protrude from the second accommodation portion, at a position corresponding to the signal generator contact electrode.

In an embodiment of the present invention, a cap unit having a fixing groove may be installed at one end of the signal generator housing. And a fixing protrusion for fixing the signal generator by being coupled to the fixing groove may be formed on a side wall of the body housing.

In an embodiment of the present invention, the signal generator housing and the body housing may be fixedly-coupled to each other by a magnetic attraction.

In an embodiment of the present invention, the main body part may further include: a power unit chargeable by a charging current supplied from the outside, and configured to supply the charging current to the ultrasonic wave receiver and the signal generator coupled to the main body part; and a charging connector installed at the body housing, and configured to receive a charging current from an external electronic device and to output the received charging current to the power unit.

Advantageous Effects

Both of the signal generator and the ultrasonic wave receiver of the present invention comprise a rechargeable battery therein whereby the same are driven, and are coupled to the main body part when a position information input is finished.

The main body part comprises a large-capacity battery which is supplied and charged with a charging current from an external electronic device. Also, the main body part charges the signal generator and the ultrasonic wave receiver by supplying the same with a charging current from the large-capacity battery when the signal generator and the ultrasonic wave receiver are coupled to the main body part.

Accordingly, the position information input apparatus of the present invention can easily be carried by coupling the signal generator and the ultrasonic wave receiver to the main body part, and additionally can always maintain the signal generator and the ultrasonic wave receiver in a charged state by providing the charging current from the large-capacity battery installed in the main body part to the signal generator and the ultrasonic wave receiver when position information is not input.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of the position information input apparatus according to the preferred embodiment of the present invention, with reference to the accompanying drawings.

Figure 1:
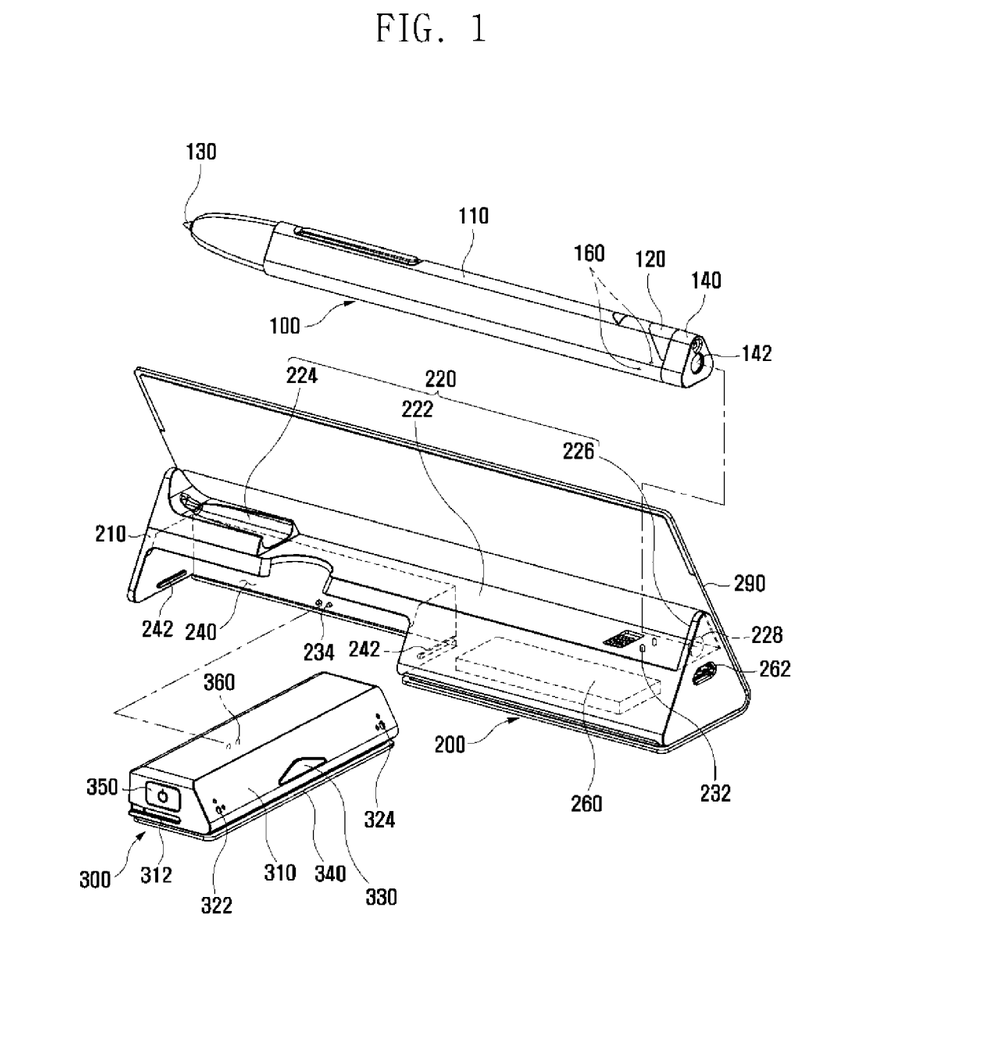
FIG. 1 is a view illustrating a configuration of a position information input apparatus according to a first embodiment of the present invention.
Figure 2:
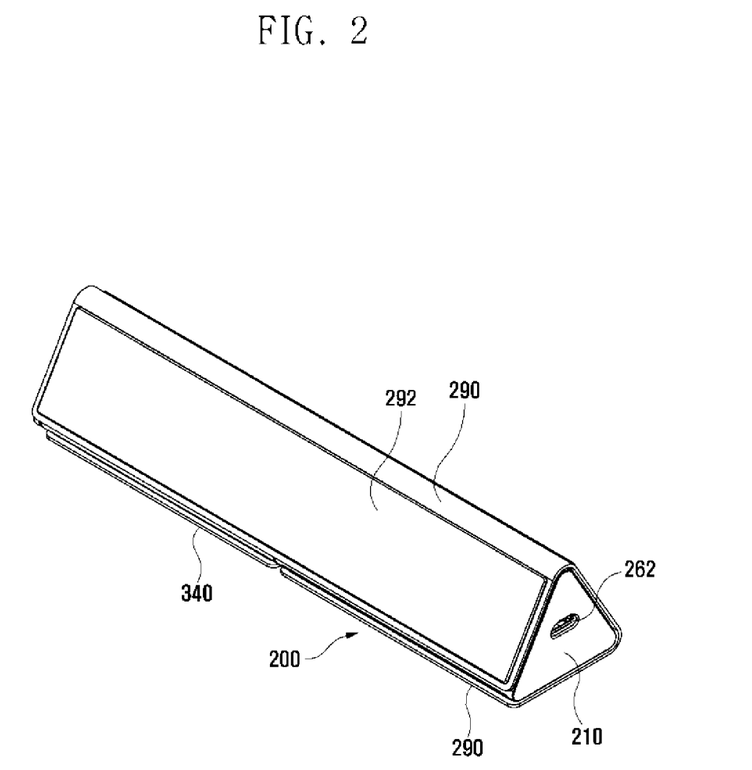
FIG. 2 is a view illustrating a state that an ultrasonic wave receiver and a signal generator have been coupled to a main body part according to a first embodiment of the present invention.
Figure 3:
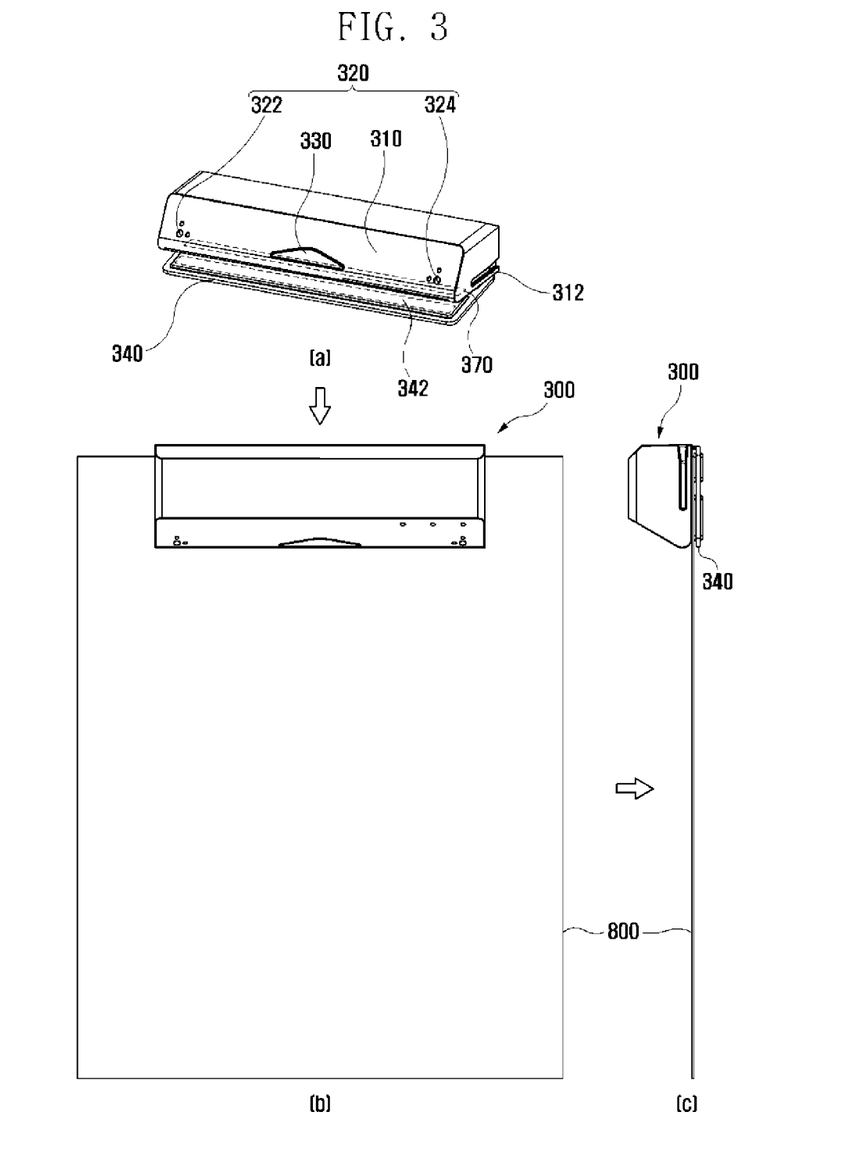
FIG. 3 is a view illustrating a configuration of an ultrasonic wave receiver according to a first embodiment of the present invention.

FIG. 1 is a view illustrating a configuration of a position information input apparatus according to a first embodiment of the present invention. FIG. 2 is a view illustrating a state that an ultrasonic wave receiver 300 and a signal generator 100 have been coupled to a main body part 200 according to a first embodiment of the present invention. FIG. 3 is a view illustrating a configuration of the ultrasonic wave receiver 300 according to a first embodiment of the present invention.

Referring to FIGS. 1 to 3, the position information input apparatus according to a preferred embodiment of the present invention will be explained.

The position information input apparatus according to a preferred embodiment of the present invention includes the ultrasonic wave receiver 300, the main body part 200, and the signal generator 100.

The signal generator 100 is configured to generate ultrasonic wave signals and a reference signal at predetermined time periods, in order to input its position information. The signal generator 100 includes, in a signal generator housing 110, an ultrasonic wave generating unit (not shown), a reference signal generating unit 120, a battery (signal generator battery) and a signal generator controller (not shown). And the signal generator 100 may further include a pen core 130 having ink therein such that a user may perform writing on a writing surface.

The signal generator 100 further includes signal generator contact electrodes 160 at a position contacting signal generator charging terminals 232 protruding from a mounting unit 220, such that a battery (not shown) therein may be charged by receiving a charging current from a power unit 260 implemented as a large-capacity battery included in the main body part 200, in a mounted state to the mounting unit 220 of a body housing 210.

For fixation of the signal generator 100 which has been mounted to the mounting unit 220, a fixing groove 142 may be formed at a cap unit 140 of the signal generator 100. The fixing groove 142 may be coupled to a fixing protrusion 228 formed on a corresponding position in a side wall 226 of the mounting unit 220 of the body housing 210.

The signal generator housing 110 shown in FIG. 1 is formed to have a triangular sectional surface. However, the shape of the sectional surface may be variable according to embodiments.

The main body part 200 includes therein the power unit 260 implemented as a large-capacity battery. Once the main body part 200 receives a charging current from an external electronic device (e.g., a charger or a USB of a computer, etc.), the large-capacity battery of the main body part 200 is charged. And if the main body part 200 is coupled to the ultrasonic wave receiver 300 and the signal generator 100, batteries included in the ultrasonic wave receiver 300 and the signal generator 100 are charged by a power of the large-capacity battery.

The main body part 200 includes a body housing 210 and a cover portion 290. And a first accommodation portion 240 for accommodating the ultrasonic wave receiver 300, and a mounting unit 220 for mounting the signal generator 100 are formed at the body housing 210. The body housing 210 includes therein the power unit 260 implemented as a large-capacity battery, and a charging connector 262 for supplying a charging current to the power unit 260 by being connected to an external electronic device is formed outside the body housing 210.

As shown in FIG. 1, the mounting unit 220 is formed at an upper part of the body housing 210, and is formed to have a triangular sectional surface in a mounted state of the signal generator 100 having a triangular sectional surface. However, the shape of the sectional surface is not limited to this.

The mounting unit 220 includes a main holder 222 on which the signal generator 100 is positioned, a side wall 226 contacting the cap unit 140 of the signal generator 100 in order to restrict movement of the signal generator 100 in a lengthwise direction, and a pen core holder 224 on which a pen tip, the end part of the pen core 130 of the signal generator 100 is positioned and for restricting movement of the pen tip.

The signal generator charging terminals 232 for supplying a charging current to the signal generator 100 by contacting the signal generator contact electrodes 160 of the signal generator 100, protrude from the main holder 222 at a position corresponding to the signal generator contact electrodes 160. A fixing groove 142 may be formed at a cap unit 140 of the signal generator 100. The fixing protrusion 228, coupled with the fixing groove 142 formed at the cap unit 140 of the signal generator 100 so as to fix the mounted signal generator 100, is formed on the side wall 226.

The first accommodation portion 240 is formed below the mounting unit 220, and ultrasonic wave receiver charging terminals 234 for supplying a charging current to the ultrasonic wave receiver 300 by contacting ultrasonic wave receiver contact electrodes 360 of the ultrasonic wave receiver 300, protrude out at a position corresponding to the ultrasonic wave receiver contact electrodes 360.

A pair of guide rails 242 for guiding and fixing an ultrasonic wave receiver housing 310 into the first accommodation portion 240, by being coupled with a pair of guide grooves 312 formed on two side surfaces of the ultrasonic wave receiver housing 310, are formed on an inner surface of the first accommodation portion 240.

As shown in FIG. 2, the cover portion 290 of the main body part 200 is coupled to the body housing 210 so as to cover the body housing 210 and the signal generator 100 mounted on the body housing 210, in order to prevent separation of the signal generator 100 and the ultrasonic wave receiver 300 from the body housing 210. Referring to FIGS. 1 and 2, the cover portion 290 may be formed of synthetic resin or synthetic leather so as to be bent at edges of the body housing 210 having a shape of triangular prism. And an adhesion member 292 formed of a non-ductile material may be attached onto the cover portion 290 at a corresponding region, so as to be adhered to each surface of the body housing 210.

The cover portion 290 may be formed to be in a cylindrical shape having a cavity therein and having a triangular sectional surface. And the ultrasonic wave receiver 300 and the signal generator 100, which have been coupled to the body housing 210, may be inserted into the cover portion 290 through one open surface of the cover portion 290.

As shown in FIGS. 1 and 3, the ultrasonic wave receiver 300 includes the ultrasonic wave receiver housing 310, and a fixing member 340 hinge-coupled to a lower surface of the ultrasonic wave receiver housing 310. In the ultrasonic wave receiver housing 310, installed are an ultrasonic wave receiving unit 320 including a plurality of ultrasonic wave receiving sensors ("ultrasonic wave sensors 322, 324") spaced from each other by a predetermined distance and for receiving ultrasonic signals generated from the signal generator 100, a reference signal receiving unit 330 for receiving a reference signal generated from the signal generator 100, a position measuring unit (not shown) for measuring distances between the signal generator 100 and the ultrasonic wave sensors 322, 324 based on times when ultrasonic wave signals and the reference signal have been received by the ultrasonic wave receiving unit 320 and the reference signal receiving unit 330, and a communication unit (not shown) for transmitting information on the measured distances to an external electronic device (e.g., a PC, a notebook, a tablet PC, a smart phone, etc.). In case of using more than 3 ultrasonic wave sensors in order to measure a position of the signal generator 100, the reference signal receiving unit 330 may be omitted.

The position measuring unit may transmit only distance data on the measured distances, to an external electronic device which uses position information of the signal generator 100. Alternatively, the position measuring unit may calculate a position of the signal generator 100 based on the measured distances, and may transmit position data. In the case where the position measuring unit transmits only the distance data to the external electronic device, the external electronic device calculates a position of the signal generator 100 based on the received distance data.

The communication unit may be implemented as a short-distance radio communication module such as Bluetooth and Zigbee.

A first magnetic member 370 is installed on a lower surface of the ultrasonic wave receiver housing 310, and a second magnetic member 342 is installed at the fixing member 340 on a position corresponding to the first magnetic member 370. The first magnetic member 370 and the second magnetic member 342 may be coupled to each other by a magnetic attraction, thereby fixing a writing member on which writing is executed (e.g., paper or a notebook) between a lower surface of the ultrasonic wave receiver housing 310 and the fixing member 340. For this, at least one of the first and second magnetic members is formed of a magnetic substance, and the other is formed of a magnetic substance, a metallic plate, etc.

Referring to FIG. 3, a usage example of the ultrasonic wave receiver 300 will be explained. Firstly, as shown in FIG. 3(*a*), one surface of the fixing member 340 is hinge-coupled to a boundary part between a bottom surface and a rear surface of the ultrasonic wave receiver housing 310. In a coupled state between the fixing member 340 and the ultrasonic wave receiver housing 310 by a magnetic attraction between the first magnetic member 370 and the second magnetic member 342, a user may apply an external force to separate the first magnetic member 370 and the second magnetic member 342 from each other. Then, the user may put a writing member 800 (paper) between the first magnetic member 370 and the second magnetic member 342, and may couple the first magnetic member 370 and the second magnetic member 342 to each other. This may allow the user to perform writing on the paper fixed between the first magnetic member 370 and the second magnetic member 342 (refer to FIGS. 3(*b*) and 3(*c*)).

Figure 4:
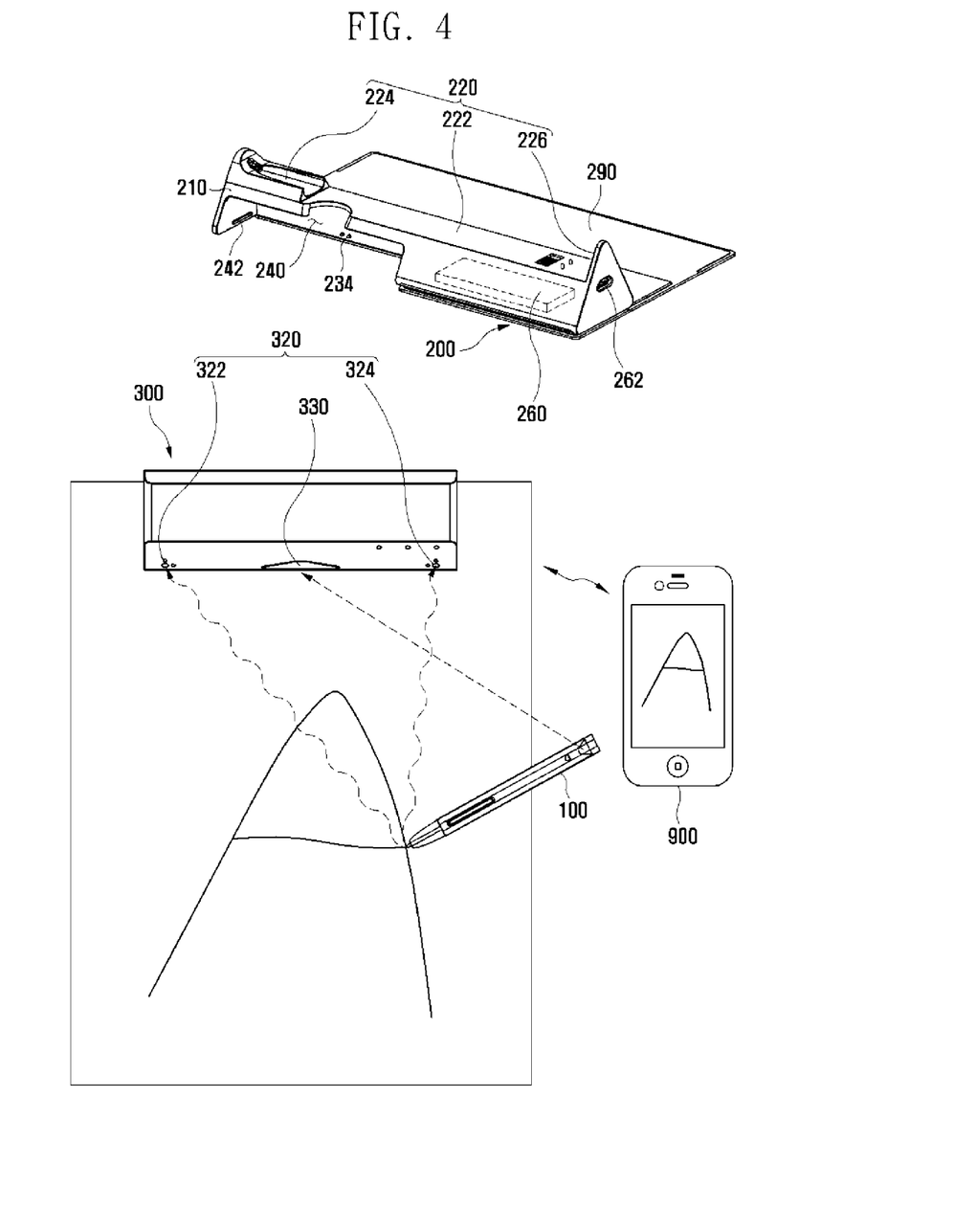
FIG. 4 is a view illustrating a position information input process using a position information input apparatus according to a first embodiment of the present invention.

FIG. 4 is a view illustrating a position information input process using the position information input apparatus according to an embodiment of the present invention.

Referring to FIG. 4, in a state where the ultrasonic wave receiver 300 and the signal generator 100 have been accommodated in the main body part 200 of the position information input apparatus of the present invention, the cover portion 290 is separated from the body housing 210, and the ultrasonic wave receiver 300 is taken out of the first accommodation portion 240 of the main body part 200. Then, the first magnetic member 370 and the second magnetic member 342 are separated from each other, thereby separating the fixing member 340 from a lower part of the ultrasonic wave receiver housing 310. Then, paper is inserted between the first magnetic member 370 and the second magnetic member 342, and the fixing member 340 is fixed to a lower surface of the ultrasonic wave receiver 300 by a magnetic force. Then, a power button 350 provided on a side surface of the ultrasonic wave receiver 300 is pressed to drive the ultrasonic wave receiver 300.

Then, a user may execute writing on the paper using the pen core 130 of the signal generator 100. In this case, the signal generator 100 generates a reference signal and ultrasonic wave signals at predetermined time periods.

The reference signal and the ultrasonic wave signals generated from the signal generator 100 are received by the reference signal receiving unit 330 and the ultrasonic wave sensors 322, 324 of the ultrasonic wave receiver 300, respectively. The position measuring unit of the ultrasonic wave receiver 300 measures distances between the signal generator 100 and the ultrasonic wave sensors 322, 324, based on time differences between a time when the reference signal has been received, and times when the ultrasonic wave signals have been received by the ultrasonic wave sensors 322, 324. Then, the position measuring unit transmits the measured distances to an external electronic device 900. The external electronic device 900 measures a position of the signal generator 100, by a triangulation using the distances between the signal generator 100 and the respective ultrasonic wave sensors 322, 324 received from the ultrasonic wave receiver 300, and using a preset distance between the ultrasonic wave sensors 322, 324. Then, the external electronic device 900 inputs the measured position. The input position information may be used as writing input information, and may be displayed on a screen. Alternatively, the input position information may be used as mouse input information.

Upon completion of the use of the position information input apparatus, the user terminates the operation of the ultrasonic wave receiver 300 by pressing the power button 350 installed on the side surface of the ultrasonic wave receiver 300. Then, the user separates the paper from the ultrasonic wave receiver 300, thereby coupling the fixing member 340 to the lower surface of the ultrasonic wave receiver 300. Then, the user accommodates the ultrasonic wave receiver 300 in the first accommodation portion 240 such that the guide rails 242 of the first accommodation portion 240 may be coupled to the guide grooves 312 of the ultrasonic wave receiver 300. Accordingly, the ultrasonic wave receiver contact electrodes 360 contact the ultrasonic wave receiver charging terminals 234 of the first accommodation portion 240. As a result, a battery inside the ultrasonic wave receiver 300 is charged by the large-capacity battery inside the body housing 210.

Then, the signal generator 100 is powered off, and the signal generator 100 is mounted to the mounting unit of the body housing 210 such that the fixing groove 142 of the cap unit 140 may be coupled to the fixing protrusion 228 formed on the side surface 226 of the mounting unit. Accordingly, the signal generator contact electrodes 160 contact the signal generator charging terminals 232 of the mounting unit. As a result, the battery inside the signal generator 100 is charged by the large-capacity battery inside the body housing 210.

So far, the ultrasonic wave receiver 300 according to the first embodiment of the present invention and the position information input apparatus having the same, have been explained.

Figure 5:
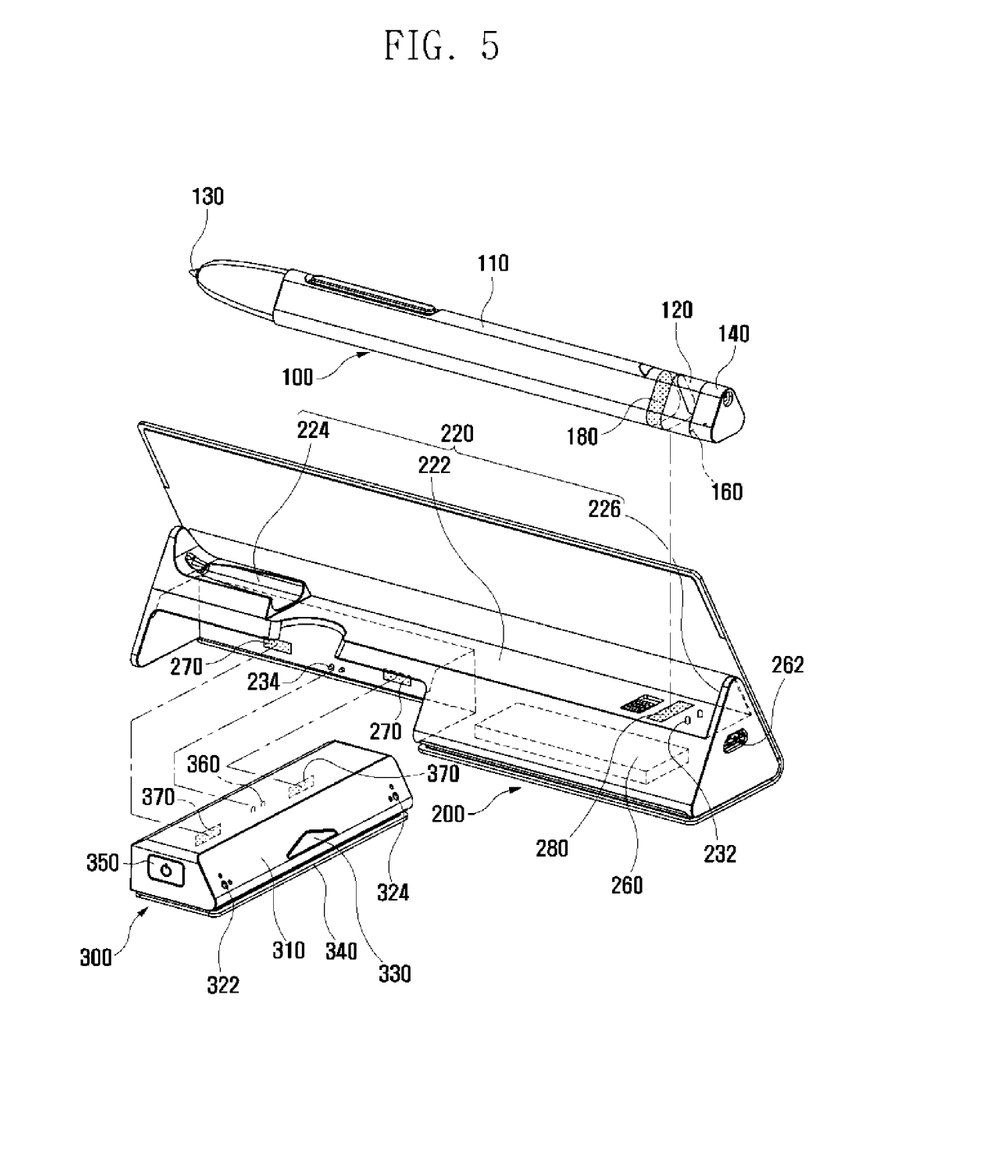
FIG. 5 is a view illustrating a configuration of a position information input apparatus according to a second embodiment of the present invention.

In the ultrasonic wave receiver 300 according to a second embodiment of the present invention and the position information input apparatus having the same, magnetic substances are used when the ultrasonic wave receiver 300 is coupled to the main body part 200, and when the signal generator 100 is mounted to the body housing 210.

Referring to FIG. 5, a configuration of the position information input apparatus according to the second embodiment of the present invention will be explained in more detail. In the aforementioned first embodiment, for coupling between the ultrasonic wave receiver 300 and the main body part 200, the guide grooves 312 formed on two side surfaces of the ultrasonic wave receiver housing 310 are coupled to the guide rails 242 of the body housing 210. However, in the second embodiment, third magnetic members 370 are formed on a rear surface or a side surface of the ultrasonic wave receiver housing 310, and fourth magnetic members 270 are installed at the first accommodation portion 240 of the body housing 210, thereby coupling the ultrasonic wave receiver 300 to the main body part 200 by a magnetic attraction between the magnetic substances. In this case, one of the third magnetic members 370 and the fourth magnetic members 270 may be formed of magnetic substances, and the other may be formed of magnetic substances or metallic plates.

Likewise, as shown in FIG. 5, a fifth magnetic member 180 may be installed at the signal generator 100, and a sixth magnetic member 280 may be installed at a corresponding position of the main holder 222. In this case, the signal generator 100 can be fixed to the mounting unit 220 by a magnetic force, and the side wall 226 of the first embodiment may be omitted. One of the fifth magnetic member 180 and the sixth magnetic member 280 may be formed of a magnetic substance, and the other may be formed of a magnetic substance or a metallic plate.

Figure 6:
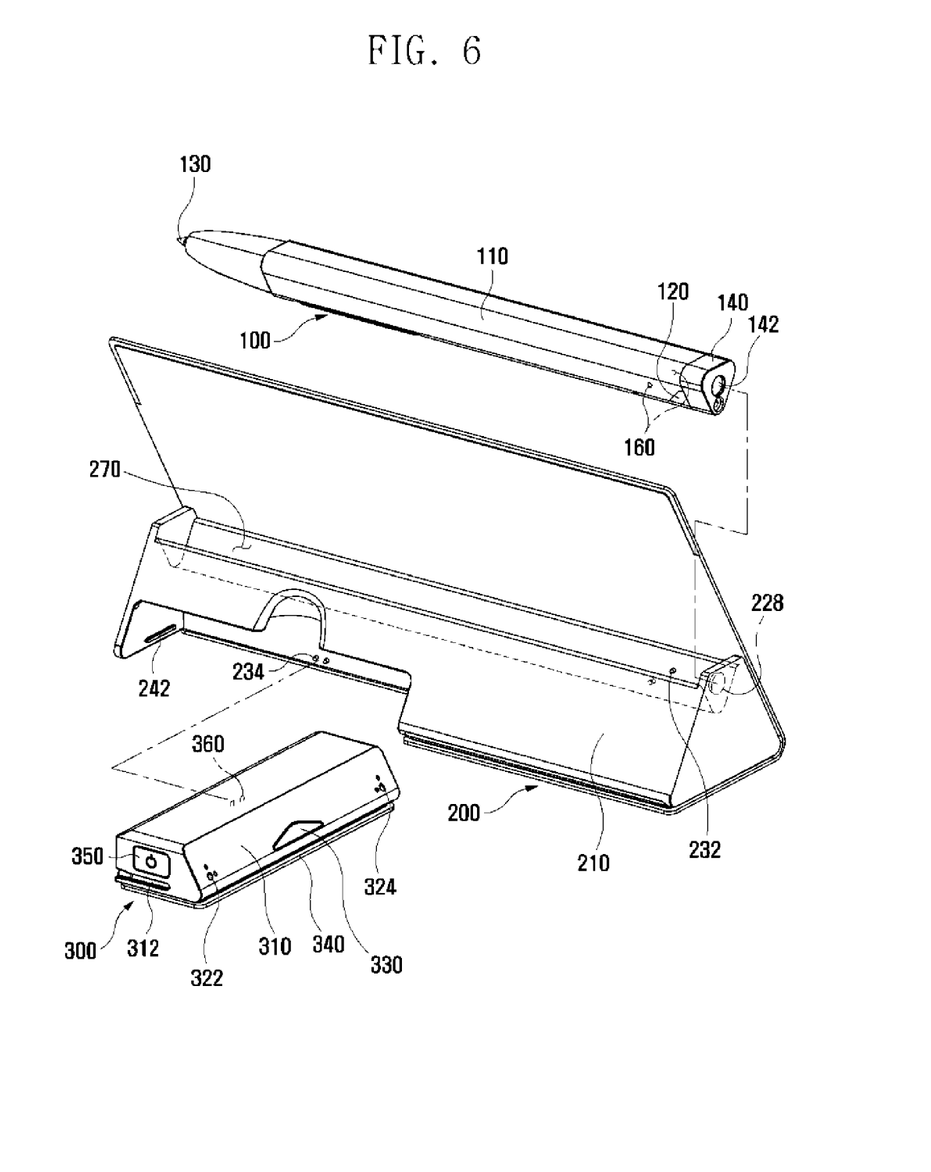
FIG. 6 is a view illustrating a configuration of a position information input apparatus according to a third embodiment of the present invention.

FIG. 6 is a view illustrating a configuration of a position information input apparatus according to a third embodiment of the present invention.

Referring to FIG. 6, the third embodiment has a configuration to form a second accommodation portion 250 at the body housing 210 in a lengthwise direction and to accommodate the signal generator 100 in the second accommodation portion 250, rather than a configuration to simply mount the signal generator 100. In this case, the signal generator 100 may be fixed by using the fixing groove 142 and the fixing protrusion 228 according to the first embodiment, or by using a magnetic force according to the second embodiment.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A position information input apparatus, comprising:
an ultrasonic wave receiver; and
a main body part including a body housing coupled to the ultrasonic wave receiver,
wherein the ultrasonic wave receiver includes
an ultrasonic wave receiving unit including a plurality of ultrasonic wave sensors spaced from each other by a preset distance and configured to receive ultrasonic wave signals generated from a signal generator;
an ultrasonic wave receiver housing having the ultrasonic wave receiving unit therein, and having a first magnetic member installed on a lower surface thereof; and
a fixing member hinge-coupled to a lower part of the ultrasonic wave receiver housing, and having a second magnetic member installed at a position corresponding to the first magnetic member,
wherein the first and second magnetic members are coupled to each other by a magnetic attraction, thereby fixing a writing member on which writing is performed between the ultrasonic wave receiver housing and the fixing member,
wherein an ultrasonic wave receiver contact electrode for receiving a charging current is formed on one surface of the ultrasonic wave receiver housing, the one surface contacting the body housing, and
wherein an ultrasonic wave receiver charging terminal for supplying a charging current to the ultrasonic wave receiver by contacting the ultrasonic wave receiver contact terminal, protrudes from the body housing at a position corresponding to the ultrasonic wave receiver contact terminal.

2. The position information input apparatus of claim 1, the ultrasonic wave receiver further comprising:
a distance measuring unit configured to measure distances between the signal generator and the ultrasonic wave sensors, based on the ultrasonic wave signals received from the ultrasonic wave receiving unit; and
a communication unit configured to transmit the distances measured by the distance measuring unit.

3. The position information input apparatus of claim 1, the ultrasonic wave receiver further comprising:
a position measuring unit configured to measure a position of the signal generator, based on the ultrasonic wave signals received from the ultrasonic wave receiving unit; and
a communication unit configured to transmit information on the position of the signal generator measured by the position measuring unit.

4. The position information input apparatus of claim 1, the ultrasonic wave receiver further comprising a battery chargeable by an external charging current, and configured to supply power to the ultrasonic wave receiver.

5. The position information input apparatus of claim 1, wherein a pair of guide grooves are formed on an outer surface of the ultrasonic wave receiver housing, and
wherein a first accommodation portion configured to accommodate the ultrasonic wave receiver therein is formed at the body housing, and
wherein a pair of guide rails for guiding and fixing the ultrasonic wave receiver housing into the first accommodation portion, by being coupled with the pair of guide grooves, are formed on an inner surface of the first accommodation portion.

6. The position information input apparatus of claim 1, wherein the ultrasonic wave receiver housing and the body housing are coupled to each other to thus be fixed by a magnetic attraction.

7. The position information input apparatus of claim 6, wherein the first accommodation portion for accommodating the ultrasonic wave receiver is formed at the body housing,
wherein a third magnetic member is formed on one surface of the ultrasonic wave receiver housing, the one surface contacting the first accommodation portion,
wherein a fourth magnetic member is installed at the first accommodation portion at a position corresponding to the third magnetic member, and
wherein as the third and fourth magnetic members are coupled to each other by a magnetic attraction, the ultrasonic wave receiver housing is fixed in an accommodated state in the first accommodation portion.

8. The position information input apparatus of claim 1, further comprising the signal generator coupled to the main body part, wherein the signal generator includes:
an ultrasonic wave generating unit configured to generate an ultrasonic wave signal;
a battery chargeable by an external charging current, and configured to supply power to the signal generator; and
a signal generator housing configured to accommodate therein the ultrasonic wave generating unit and the battery, and
wherein the battery is charged as the signal generator is coupled to the main body part to receive a charging current from the main body part.

9. The position information input apparatus of claim 8, wherein a signal generator contact electrode for receiving a charging current is formed on one surface of the signal generator housing, the one surface contacting the body housing,
wherein a mounting unit for mounting the signal generator is formed at the body housing, and
wherein a signal generator charging terminal for supplying a charging current to the signal generator by contacting the signal generator contact electrode protrudes from the mounting unit, at a position corresponding to the signal generator contact electrode.

10. The position information input apparatus of claim 9, wherein the main body part further includes a cover portion for covering the body housing and the signal generator, in order to fix the signal generator mounted to the mounting unit.

11. The position information input apparatus of claim 8, wherein a signal generator contact electrode for receiving a charging current is formed on one surface of the signal generator housing, the one surface contacting the body housing,
wherein a second accommodation portion for accommodating the signal generator therein is formed at the body housing, and
wherein a signal generator charging terminal for supplying a charging current to the signal generator by contacting the signal generator contact electrode protrudes from the second accommodation portion, at a position corresponding to the signal generator contact electrode.

12. The position information input apparatus of claim 8, wherein a cap unit having a fixing groove is installed at one end of the signal generator housing, and
wherein a fixing protrusion for fixing the signal generator by being coupled to the fixing groove is formed on a side wall of the body housing.

13. The position information input apparatus of claim 8, wherein the signal generator housing and the body housing are fixedly-coupled to each other by a magnetic attraction.

14. The position information input apparatus of claim 1, wherein the main body part further includes:
a power unit chargeable by a charging current supplied from the outside, and configured to supply the charging current to the ultrasonic wave receiver and the signal generator coupled to the main body part; and
a charging connector installed at the body housing, and configured to receive a charging current from an external electronic device and to output the received charging current to the power unit.

* * * * *